United States Patent [19]
Pehlgrim et al.

[11] Patent Number: 4,586,384
[45] Date of Patent: May 6, 1986

[54] PRESSURE OR PRESSURE DIFFERENCE MEASURING INSTRUMENT

[75] Inventors: Horst Pehlgrim; Moriz von Rauch, both of Berlin, Fed. Rep. of Germany

[73] Assignee: Siemens Aktiengesellschaft, Munich, Fed. Rep. of Germany

[21] Appl. No.: 705,132

[22] Filed: Feb. 25, 1985

[30] Foreign Application Priority Data

Mar. 9, 1984 [DE] Fed. Rep. of Germany ....... 8407659

[51] Int. Cl.⁴ ............................................... G01L 7/08
[52] U.S. Cl. ........................................ 73/716; 73/720
[58] Field of Search ................. 73/716, 717, 718, 719, 73/720, 721, 722, 706; 361/283

[56] References Cited

U.S. PATENT DOCUMENTS

| 4,080,830 | 3/1978 | Eckstein et al. | 73/719 |
| 4,135,407 | 1/1979 | Ezekiel | 73/717 |
| 4,342,231 | 8/1982 | Yammamoto et al. | 73/721 |
| 4,527,428 | 7/1985 | Shimada et al. | 73/718 |

FOREIGN PATENT DOCUMENTS

| 2617731 | 10/1977 | Fed. Rep. of Germany . |
| 2657933 | 4/1980 | Fed. Rep. of Germany . |
| 3047276 | 9/1981 | Fed. Rep. of Germany . |
| 3222620 | 8/1983 | Fed. Rep. of Germany . |
| 0057134 | 4/1984 | Japan ................................ 73/715 |

Primary Examiner—Donald O. Woodiel
Attorney, Agent, or Firm—Kenyon & Kenyon

[57] ABSTRACT

A pressure or pressure difference measuring instrument with a central part which has separating seal diaphragms at its end faces and which contains a pressure-sensing device is disclosed. In order to arrange the pressure-sensing device in the central part, the central part is provided in a circumferential area between the end faces with a pot-like recess into which a carrier for the pressure sensing device is inserted. The carrier has a cross hole which changes into a pressure-transmitting canal in the central part in such a position that due to the carrier being welded to the central part, there is produced at the same time a seal in the area of the point of transition from the cross hole to the pressure transmitting canal.

2 Claims, 2 Drawing Figures

PRESSURE OR PRESSURE DIFFERENCE MEASURING INSTRUMENT

BACKGROUND OF THE INVENTION

The present invention relates to a pressure or pressure difference measuring instrument having a central part which has separating diaphragms at its sides and which contains a pressure sensing device.

One known measuring instrument of this kind, shown in DE-OS No. 32 33 620, is of relatively simple design because it can operate without a relatively large equalizing chamber with an equalizing diaphragm for overload protection. In this known measuring instrument, there is provided on the central part, in the vicinity of each separating diaphragm present on a central part face, in pressure-transmitting connection to the separating diaphragm, a supplementary diaphragm in preloaded contact with the central part. In addition, each separating diaphragm is connected through internal channels to the supplementary diaphragm adjacent to the respective other separating diaphragm. The details of how the pressure-sensing device is accommodated in the central part is not explained in this publication, however.

SUMMARY OF THE INVENTION

It is, therefore, an object of the present invention to provide a pressure or pressure difference measuring instrument, in which the pressure-sensing device can be arranged in the central part in a designwise simple and productionwise favorable manner.

The above and other objects of the present invention are achieved by a pressure or pressure difference measuring instrument comprising a central portion having end faces, a separating diaphragm being disposed on each end face, the central portion having a recess in an area between the diaphragms, a pressure sensing device being disposed in the recess, a carrier member for supporting the pressure-sensing device being inserted into the recess, the carrier member having a cross hole which terminates in a pressure-transmitting canal in the central portion, the outer surface of the carrier member being joined to the central portion by a welded connection so that a seal is produced in the area of the point of transition from the cross hole to the pressure-transmitting canal by the welded connection.

One significant advantage of the pressure or pressure difference measuring instrument according to the invention consists in that its pressure-sensing device is attached in simple manner to the central portion. This is accomplished in that, due to the welded connection joining the pressure-sensing device and the central portion together, a seal is effected at the same time between the transverse hole and the pressure-transmitting canal in the area of the transition. Thus, a good seal is obtained at the circumference of the pressure-sensing device carrier without additional measures so that a direct connection from one pressure sensor side to the other and to the outside is avoided.

This sealing mode between the transverse hole in the carrier and the pressure-transmitting canal of the central portion makes it unnecessary to bring the pressure-transmitting canal out of the central portion and to have to mount the pressure-sensing device to the outside of the central portion, such as is the case in the differential pressure transducer shown in DE-OS No. 30 47 276 or U.S. Pat. No. 4,342,231. In this known transducer, a relatively large rim hole is provided in the pressure-sensing device carrier to obtain a connection to the one side of the pressure sensor proper by means of a welded-in sealing part. Consequently, the measuring instrument according to the present invention also has the advantage that its central part is of relatively low design, therefore requiring little space.

In the measuring instrument according to the present invention, the welded connection is advantageously an electron beam-welded connection.

BRIEF DESCRIPTION OF THE DRAWINGS

The invention will be described in greater detail in the following detailed description with reference to the drawings in which.

DETAILED DESCRIPTION

Figure 1:
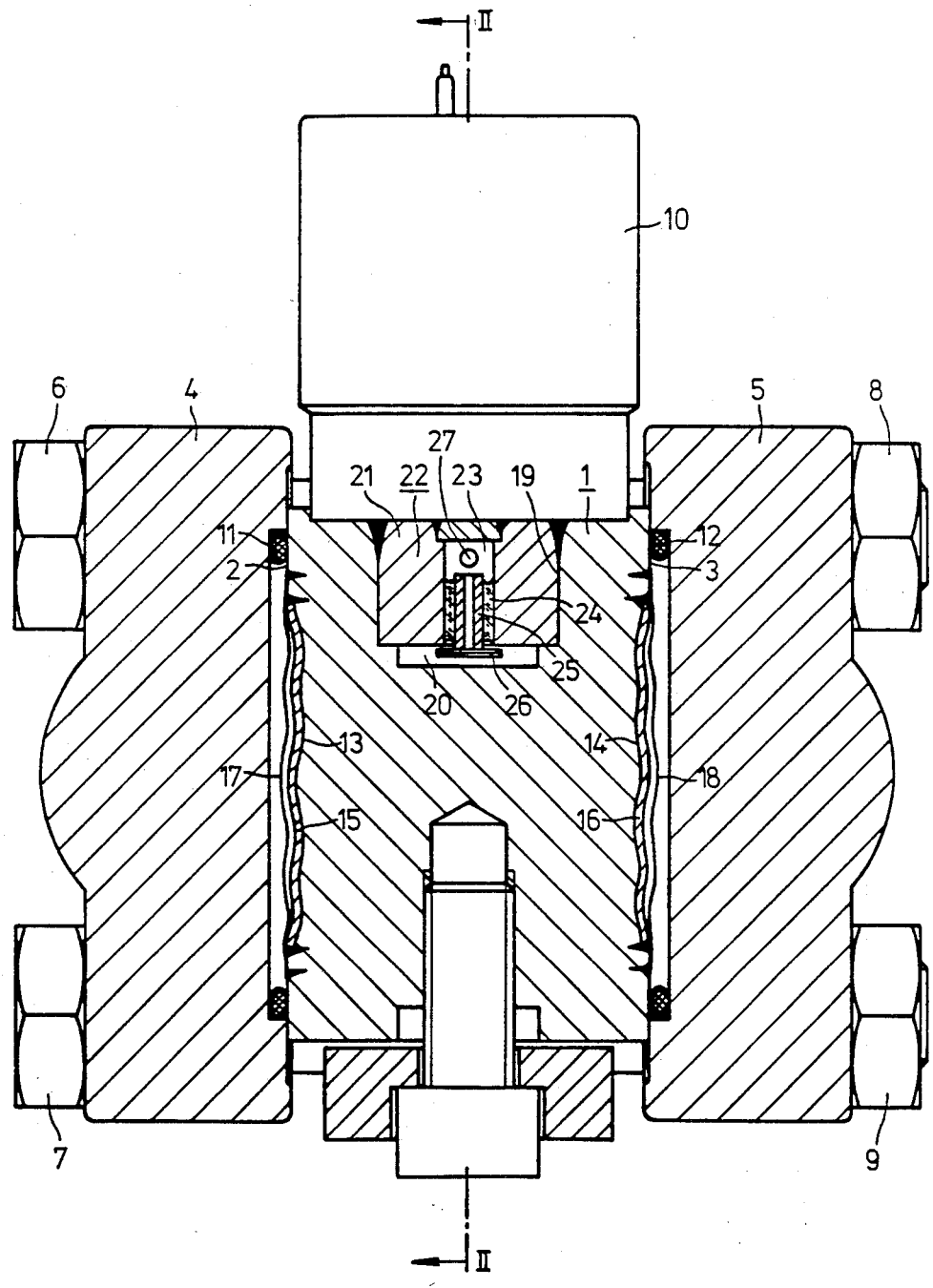
FIG. 1 depicts one embodiment of the pressure or pressure difference measuring instrument according to the invention, shown in a cross sectional view transverse to the plane of the diaphragms.
Figure 2:
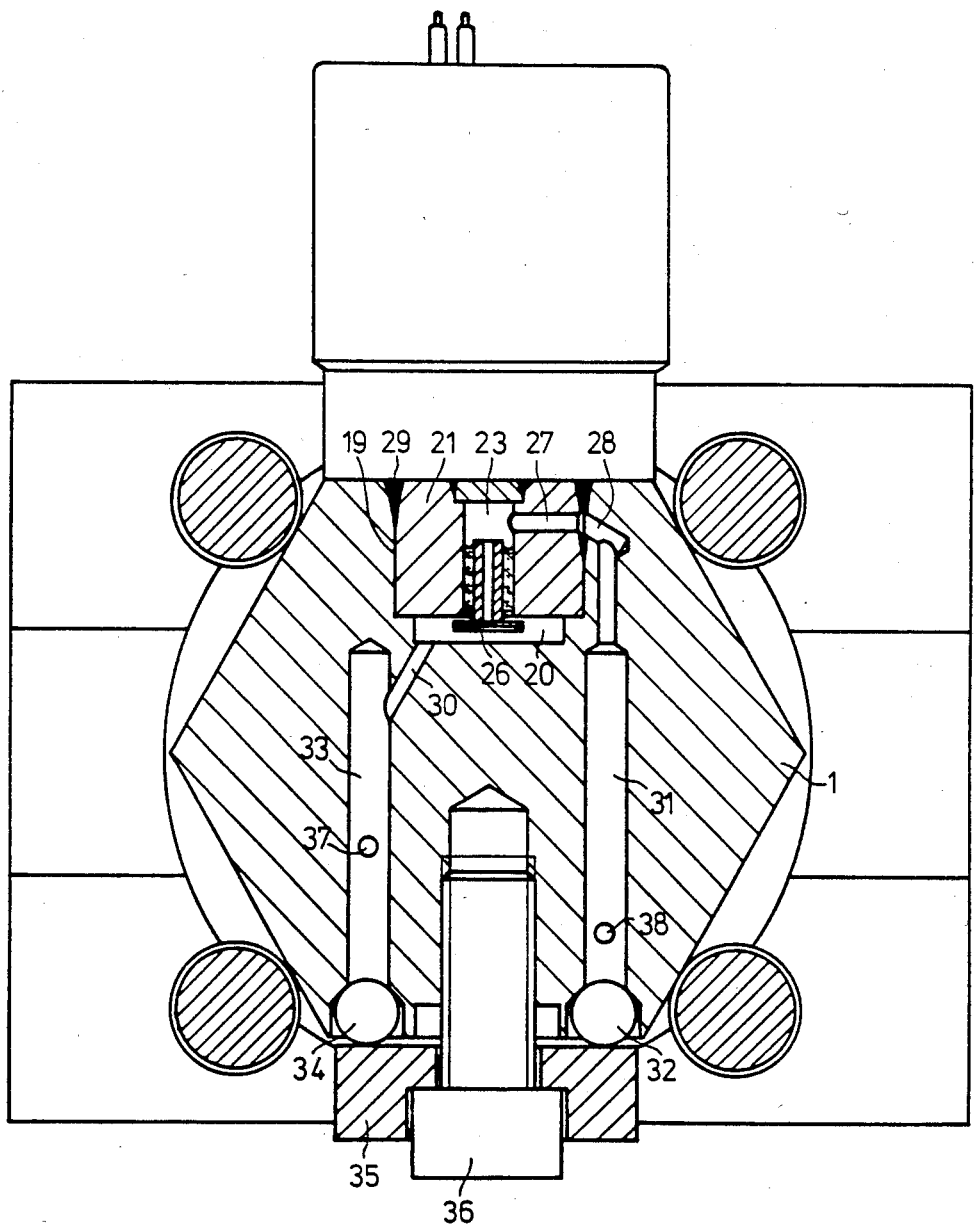
FIG. 2 is a cross sectional view through line II—II of FIG. 1.

With reference now to the drawings, the embodiment of a pressure or pressure difference measuring instrument depicted in FIGS. 1 and 2 has a central part 1, both of whose side faces 2 and 3 are covered by housing caps 4 and 5. Through openings (not shown) in the two housing caps, the measuring instrument is connected to the medium whose pressure or differential pressure is to be determined. The central part 1 and the housing caps 4 and 5 are clamped together by screw bolts 6 and 7 and nuts 8 and 9. In the area between the housing caps 4 and 5, above the central part 1 in the figure, is a housing 10 in which the electronic circuitry of the measuring instrument or circuit parts are accommodated. For clarity, only the outer contour of the housing 10 is shown in the figures.

As is evident from FIG. 1 in particular, the housing caps 4 and 5 are pressed against the central part 1 via sealing rings 11 and 12. The two faces 2 and 3 of the central part 1 are so designed that diaphragm beds 13 and 14 are formed therein. Welded to both faces 2 and 3 of the central part 1 are supplementary diaphragms 15 and 16, respectively, which are preloaded in such a manner that they are pressed against the respective diaphragm beds 13 and 14. Also provided at each of the faces 2 and 3 of the central part 1 is a separating diaphragm 17 and 18, respectively. The diameter of the supplementary diaphragms 15 and 16 is smaller than that of the separating diaphragms 17 and 18.

In the circumferential area between the diaphragms, the central part 1 has a pot-like recess 19 which, in the embodiment depicted, has another recess 20 of smaller dimensions towards the interior of the central part 1. A carrier 21 of a pressure sensing device 22 is inserted into the pot-like recess 19. The carrier 21 has a longitudinal bore 23, welded shut on top, in which a small tube 25 is held by means of a glass seal 24. This tube 25 projects slightly downward from the longitudinal bore 23 of the carrier 21. A semiconductor sensor 26, which may be a semiconductor sensor of known design (see, e.g., DE-OS No. 26 17 731 or U.S. Pat. No. 4,080,830) is soldered to the projecting end of the tube 25.

As shown particularly in FIG. 2, the carrier 21 has a cross hole 27 extending from the longitudinal bore 23 to the edge of the carrier 21. When carrier 21 is inserted in the recess, the cross hole 27 ends in a pressure-transmitting canal 28 in the central part 1.

The outer edge of the carrier 21 is rigidly joined to the central part 1 by a weld 29. Due to the location of the cross hole 27 and the welded connection 29, a seal is produced in the area of the point of transition from the cross hole 27 to the pressure-transmitting canal 28 around the point of transition, but leaving free a passage opening. Therefore, the pressure in the pressure-transmitting canal 28 cannot reach the side of the semiconductor sensor 26 located in the other recess 20 along the cylindrical parting gap between the carrier 21 and the central part 1. Another pressure-transmitting canal 30 terminates in the other recess 20. To obtain the desired seal with a passage left open, the cross hole 27 is provided, prior to the welding operation, with a depression at the edge of the carrier 21 to avoid excess material at the point of transition.

The pressure-transmitting canal 28 is connected to a connecting canal 31 sealed to the outside by a ball seal 32. Analogously, the other pressure-transmitting canal 30 is connected to another connecting channel 33, sealed to the outside by another ball seal 34. The two ball seals 32 and 34 are pressed against their sealing points by a pressure plate 35 and a threaded bolt 36. Both connecting canals 31 and 33 lie in the same plane, which represents a plane parallel to the end faces 2 and 3 of the central part 1.

Emanating from each of the connecting canals 31 and 33 located in one plane between the faces 2 and 3 of the central part 1 in the embodiment shown having two separating diaphragms 17 and 18 and two supplementary diaphragms 15 and 16, are two canals, of which only one, 37 and 38, respectively, for each connecting canal, can be seen in FIG. 2. Of these canals, canal 37 leads to the supplementary diaphragm 15 and canal 38 to the separating diaphragm 17 on one and the same end face 2 of the central part 1. Another canal 38, not shown, leads from the connecting canal 31 to the supplementary diaphragm 16 and an additional canal 37, also not shown, leads from the other connecting canal 33 to the separating diaphragm 18. All canals inside the central part 1 and the cross hole 27 as well as the other recess 20 are filled with a pressure-transmitting fluid.

It is pointed out in closing that the invention by no means is applicable only to pressure or pressure difference measuring instruments with separating and supplementary diaphragms at each end face of the central part, but also is advantageous in those pressure or pressure difference measuring instruments equipped with an equalizing diaphragm in an equalizing chamber, such as is the case in an instrument according to DE-OS No. 30 47 276 (U.S. Pat. No. 4,342,231) or in a device according to DE-AS No. 26 57 933, for instance.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A pressure or pressure difference measuring instrument comprising a central portion having end faces, a separating diaphragm being disposed on each end face, the central portion having a recess in an area between the diaphragms, a pressure sensing device being disposed in the recess, a carrier member for supporting the pressure-sensing device being inserted into the recess, the carrier member having a cross hole which terminates in a pressure-transmitting canal in the central portion, the outer surface of the carrier member being joined to the central portion by a welded connection so that a seal is produced in the area of the point of transition from the cross hole to the pressure transmitting canal by the welded connection.

2. The measuring instrument recited in claim 1, wherein the welded connection is an electron beam welded connection.

* * * * *